United States Patent
Mendoza Vicioso

(10) Patent No.: US 8,075,146 B2
(45) Date of Patent: Dec. 13, 2011

(54) FIXING DEVICE FOR POSITION REGULATING MECHANISMS FOR EXTERNAL REAR-VIEW MIRRORS ON MOTOR VEHICLES

(75) Inventor: Jose Mendoza Vicioso, La Roca del Valles (ES)

(73) Assignee: Fico Mirrors, S.A., Barcelona (ES)

( * ) Notice: Subject to any disclaimer, the term of this patent is extended or adjusted under 35 U.S.C. 154(b) by 419 days.

(21) Appl. No.: 12/298,237

(22) PCT Filed: Apr. 30, 2007

(86) PCT No.: PCT/EP2007/003849
§ 371 (c)(1),
(2), (4) Date: Oct. 23, 2008

(87) PCT Pub. No.: WO2007/128468
PCT Pub. Date: Nov. 15, 2007

(65) Prior Publication Data
US 2009/0244743 A1 Oct. 1, 2009

(30) Foreign Application Priority Data
May 5, 2006 (ES) .............. 200601030 U

(51) Int. Cl.
*G02B 7/182* (2006.01)
*A47G 1/24* (2006.01)
*B60R 1/02* (2006.01)

(52) U.S. Cl. ......................... 359/871; 248/478
(58) Field of Classification Search ............. 359/871, 359/872, 877; 248/477, 478, 491
See application file for complete search history.

(56) References Cited

U.S. PATENT DOCUMENTS
2001/0009481 A1* 7/2001 Apfelbeck ............ 359/871

FOREIGN PATENT DOCUMENTS
DE 199 02 755 A1 7/2000
EP 0 838 598 A2 4/1998
WO 96/29213 A2 9/1996

* cited by examiner

*Primary Examiner* — Alessandro Amari
(74) *Attorney, Agent, or Firm* — Sughrue Mion, PLLC

(57) ABSTRACT

A fixing device for position regulating mechanisms for external rear-view mirrors for motor vehicles, applicable to external rear-view mirrors of the type which are comprised of a support (1), attached to which is a housing (6) which encases or is part of the aforementioned position regulating mechanism (2), to which a mirror support plate is affixed, it being possible to operate the same, manually or electrically, from the interior of the vehicle. The support (1) comprises elastic pressure exertion means (4) comprising a portion of the base (5) arranged on the support (1) and are provided with at least one tab (7), which pressure exertion means (4) are intended to withstand the pressure of the housing of the regulating mechanism when the latter is attached to the support by means of the fixing means, said pressure means being elastically distorted in such a way that they exert an effort force on the housing against the fixing means.

17 Claims, 3 Drawing Sheets

FIXING DEVICE FOR POSITION REGULATING MECHANISMS FOR EXTERNAL REAR-VIEW MIRRORS ON MOTOR VEHICLES

TECHNICAL FIELD OF THE INVENTION

The object of this invention is the improvement of a fixing device for position regulating mechanisms for external rear-view mirrors on motor vehicles.

BACKGROUND OF THE INVENTION

Embodiments of rear-view mirrors for motor vehicles, comprised of a support and an external housing coupled together are widely known; said support being equipped with a fixing means intended to allow the attachment of the position regulating mechanism of a mirror support plate, said regulating mechanism being adjustable from the interior of the motor vehicle in order to position the mirror support plate, and consequently the mirror, in accordance with the needs of vision of the motor vehicle driver.

Generally, the support of an external rear-view mirror, such as those detailed above, is comprised of a single-piece body produced by means of the injection of plastic or metal material, said fixing means devoted to the fixing of a regulating mechanism being configured on the single-piece body. With the aim of reducing the play which exists between the parts, and to prevent the vibrations transmitted from the vehicle to the rear-view mirror from moving or damaging its components, in addition to the aforementioned fixing means a secondary fixing means is habitually used, this being devoted to guaranteeing the attachment between the support and the regulating mechanism.

In embodiments which are already known, there are housings which encase a regulating mechanism which are fixed to external rear-view mirrors by means of the wedging of projections made into the notches of the housing, forming in this way the aforementioned primary fixing means, and by means of a bolt screwed into the hole of the support, the latter forming said secondary means of fixing.

Said fixing means fulfil the aforementioned objective of guaranteeing the attachment between the support and the regulating mechanism, and in the event of there appearing additional play between components due to wear or distortion of certain parts, allow the bolt to be re-tightened in order to fix once again the adjustable fixing mechanism to the support. The drawback of this embodiment lies in its assembly as, it being comprised of several different parts, the bolt and the hole, its assembly requires labour or highly costly machinery.

Improving the reliability of the fixture between the different parts of the device, in order to avoid possible accidental dismantling of the parts is also an aim of the invention.

EXPLANATION OF THE INVENTION

The fixing device for position regulating mechanisms for external rear-view mirrors for motor vehicles which is the object of this invention is applicable to rear-view mirrors of the type which comprise a plastic support to which a housing is fixed by a means of attachment; said housing encases or is part of the aforementioned regulating mechanism, to which a mirror support plate is attached, it being possible to operate the same, manually or electrically, from the interior of the vehicle; it is essentially characterised in that the support comprises an elastic pressure exertion means devoted to withstanding the pressure exerted by the housing of the regulating mechanism when it is attached to the support by the fixing means, said pressure means being elastically distorted in such a way that they exert pressure against the fixing means on the housing.

In accordance with another characteristic of the invention, the aforementioned elastic pressure exertion means on the support comprise a section of the base which is provided with at least one tab formed by means of a cut-out portion of said section of the base of the support, this being bent towards the fixing means at the joining zone with the same, protruding sufficiently for it to be forcibly distorted by the housing of the retaining mechanism when the latter is attached to the support by the fixing means, in this way achieving an automatic re-adjustment of the attachment of the regulating mechanism to the support. Thus, the elastic pressure exertion means are included in the same part as the supporting part 1, and therefore may be formed by means of the injection of plastic material into a single mould, with no need for an assembly for joining the same.

In accordance with another characteristic of the invention, the support comprises three tabs arranged radially at 120° around an imaginary circumference and whose distal ends are facing outwards.

BRIEF DESCRIPTION OF THE DRAWINGS

In the attached drawings is a portrayal, as a non-limitative example, of an embodiment of the fixing device for position regulating mechanisms for the external rear-view mirrors of motor vehicles. In said drawings.

DETAILED DESCRIPTION OF THE DRAWINGS

Figure 1:
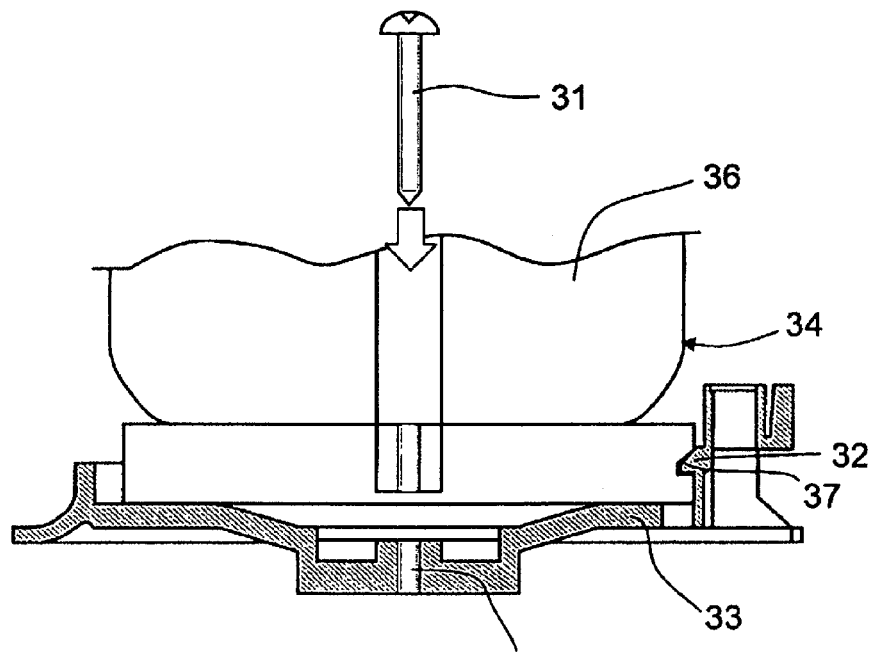
FIG. 1 is a side view of a known embodiment of a housing encasing a regulating mechanism and of a support for an external rear-view mirror in a position prior to their mutual joining by a fixing means.
Figure 2:
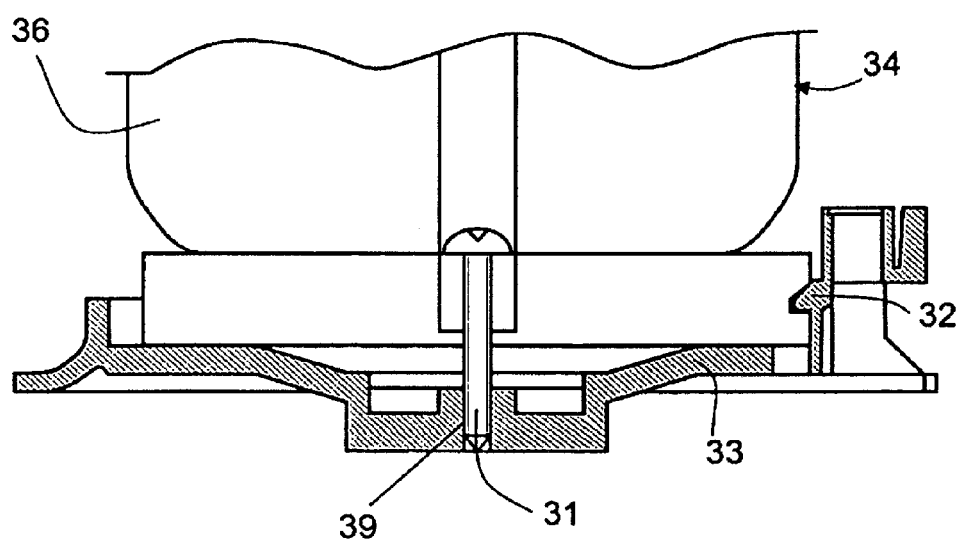
FIG. 2 is a side view of the coupling of the regulating means with the support portrayed in FIG. 1.

In FIGS. 1 and 2 of the drawing sheets is a portrayal of a housing which encases a regulating mechanism and a support for an external rear-view mirror of a known embodiment of a fixing device, developed by the applicant, in a position prior to their mutual coupling and in the coupled position, respectively.

In said figures, it may be seen that the fixing of the regulating mechanism 34 to the support 33 is carried out by means of the lodging of the projections 32 in the notches 37 of the housing 36, thus forming a primary fixing means, and by a bolt 31 screwed into the hole 39 in the support 33, these last forming the secondary fixing means.

The secondary fixing means disclosed in the embodiment portrayed in FIGS. 1 and 2 fulfil the aforementioned objective of guaranteeing the fixing between the support 33 and the regulating mechanism 34, and in the event of additional play between parts appearing due to wear or to distortion of certain parts, allow the bolt 31 to be re-tightened and the regulating mechanism 34 to be adjustedly fixed once again to the support 33. The drawback of said embodiment lies in its assembly as, it being comprised of various separate parts, the bolt 31 and the hole 39, its assembly requires labour or highly costly machinery.

The fixing device which is the object of this invention and whose embodiment is described as an example is also applicable to external rear-view mirrors of the type formed by a framework-support and a support which is attachable to the bodywork of a motor vehicle, and which also comprises a support and a housing which may be coupled together and with said framework-support and support, of the type which due to its being well-known and for reasons of simplification, only the support 1 provided in the device of the invention, and this only partially, has been portrayed.

Figure 3:
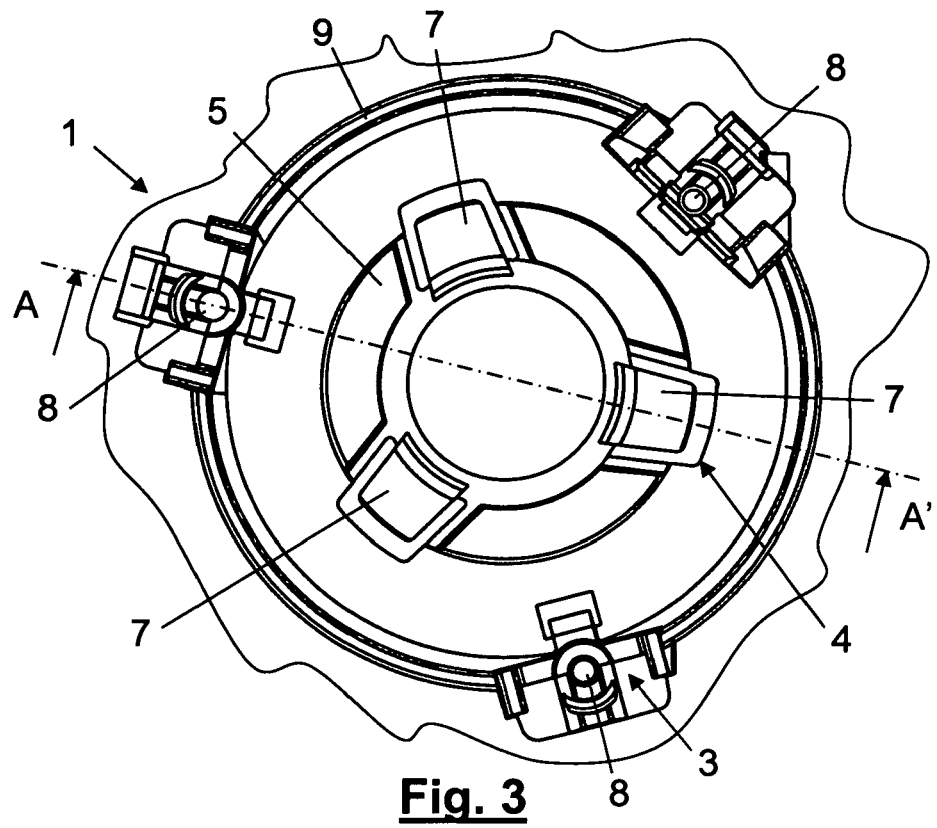
FIG. 3 is a plan view of the fixing device for position regulating mechanisms for rear-view mirrors which is the object of this invention, where the housing which encases or is part of the regulating mechanism is not attached.
Figure 4:
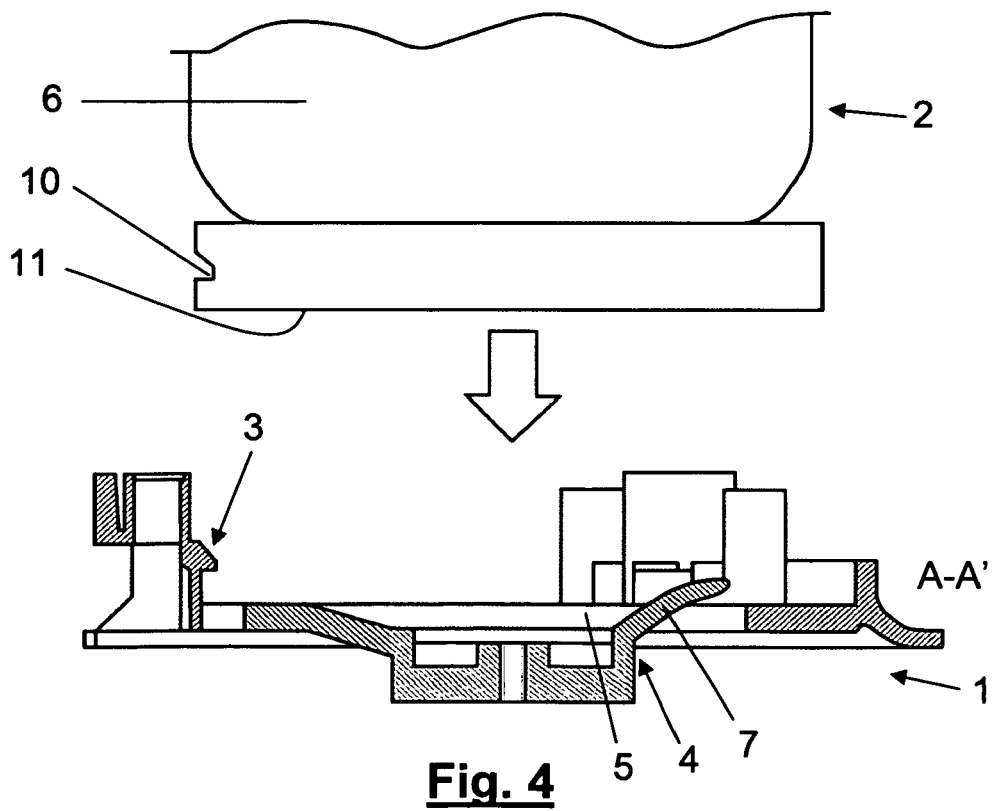
FIG. 4 is a side view of the fixing device in FIG. 3, in section along a transversal plane, with the housing prepared for coupling.
Figure 5:
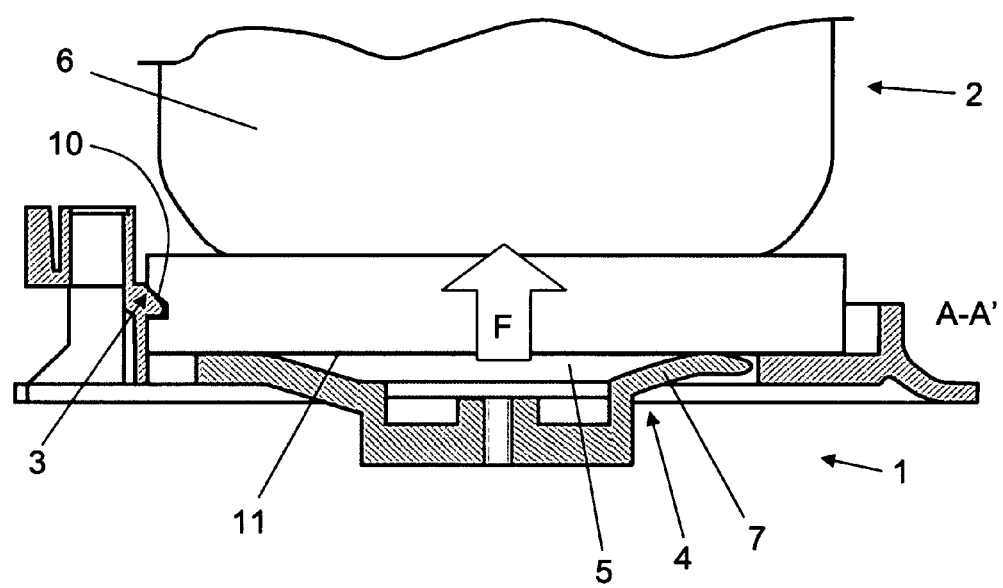
FIG. 5 is a side view of the fixing device in FIG. 4, where the housing which encases or is part of the regulating mechanism is portrayed in the attached position.

In FIGS. 3 to 5 a fixing device may be seen; said device comprises an essentially flat support 1 which is equipped with three fixing seats 8 distributed regularly around a circumference, that is, each one separated from the next by an angle of 120°, and coupled together by a circumferential rib 9, each fixing seat 8 being equipped with a fixing means 3 intended for holding a regulating mechanism 2.

A preferred embodiment of the fixing device may be observed in FIG. 3, before said device is coupled to a position regulating mechanism 2 for external rear-view mirrors of motor vehicles, not portrayed. The fixing device also comprises an elastic pressure exertion means 4 intended to act as a buffer for the aforementioned regulating mechanism 2.

Said elastic pressure exertion means 4 is comprised of a portion of the base 5 arranged on the support 1 and provided with three elastic tabs 7 arranged radially at 120° around an imaginary circumference and whose distal ends are facing outwards. Said tabs are formed by a formed by means of a cut-out portion of said section of the base 5 of the support 1, being part of the same supporting part 1, and it therefore being possible to form the same by means of the same mould used to form the supporting piece 1.

In FIG. 4 it may be seen that the tabs 7 are bent towards the fixing means 3 at the zone where they join the portion of base 5 of the support 1, protruding sufficiently so as to be forcibly distorted by the housing 6 of the retaining mechanism 2 when the latter is attached to the support 1 by means of the fixing means 3, as shall be seen below.

FIG. 5 portrays the fixing device to which a housing 6 is attached, which encases a regulating mechanism 2. Said housing 6 is comprised of a fixing means 10 which is complementary to the fixing means 3 of the support 1, and an essentially flat base 11. At the moment of attaching the regulating mechanism 2 to the support 1 by means of the fixing means 3, the elastic pressure exertion means 4, in this case the three tabs 7, are simultaneously elastically distorted by the base 11 of the housing 6 in such a way that they exert an upward effort force, represented by the arrow F in FIG. 5. Said force F obliges the housing 6 to be permanently pressed against the fixing means 3, eliminating all tolerances or play between the fixing means 3 of the support 1 and the housing 6, contributing, along with the fixing means 3, to maintaining the regulating mechanism 2 firmly attached to the support 1.

Obviously, those embodiments in which said elastic pressure exertion means 4 consists of external elements added to the portion of the base 5 of the support 1 are within the scope of this protection.

The invention claimed is:

1. A fixing device for a position regulating mechanism for external rear-view mirrors for motor vehicles comprising:
   a support;
   a housing configured to be attached to the support which encases or is part of the position regulating mechanism;
   a mirror support plate affixed to the housing, such that the mirror support plate is operable, manually or electrically, from the interior of the vehicle;
   wherein the support comprises:
      an elastic pressure exertion mechanism;
      a fixing mechanism;
   wherein, when the housing is attached to the support, the elastic pressure exertion mechanism is elastically distorted such that the elastic pressure exertion mechanism exerts a force on the housing to press the housing against the fixing mechanism, thereby fixing the housing to the support;
   the elastic pressure exertion mechanism comprising:
      at least one tab formed from a cut-out portion of a section of a base of the support;
      wherein, at a location where the at least one tab is attached to the support, the at least one tab is bent towards the fixing mechanism; and
      wherein the tab protrudes away from the base such that the tab is configured to be forcibly distorted by the housing when the housing is attached to the support by the fixing mechanism.

2. The fixing device according to claim 1, wherein the support comprises a plurality of tabs arranged equiangularly with respect to each other and aligned in a radial direction with a distal end of each tab facing outwards.

3. The fixing device, according to claim 2, wherein support comprises three tabs arranged radially at 120°.

4. A fixing device for attaching a position regulating mechanism to an external rear-view mirror of a motor vehicle comprising:
   a housing that houses the position regulating mechanism;
   a support configured to be attached to the housing, the support comprising:
      a base;
      at least one elastic spring formed from or attached to the base wherein the elastic spring protrudes above the base before the housing has been attached to the support so as to apply a force against the housing when the housing is attached to the support; and
      at least one fixing protrusion extending above the base;
   wherein the housing further comprises at least one surface portion configured to abut the at least one fixing protrusion;
   wherein the housing is configured to attach to the support by pressing the housing against the at least one elastic spring until the at least one fixing protrusion engages the abutting surface portion, thereby securing the housing to the support;
   wherein the fixing device further comprises a plurality of elastic springs and a plurality of fixing protrusions on the base and corresponding abutting surface portions on the housing; and
   wherein each surface portion is a notch into which the corresponding fixing protrusion is inserted when the housing is attached to the support.

5. The fixing device according to claim 4, wherein the base has a shape that is substantially flat and circular.

6. The fixing device according to claim 4, wherein each elastic spring is aligned to apply a force in a direction towards one of the surface portions and corresponding fixing protrusion.

7. The fixing device according to claim 4, wherein the elastic springs are arranged equiangularly around a center of the support and aligned along a radius of the support.

8. The fixing device according to claim 4, wherein each elastic spring is a cantilever spring.

9. A fixing device for attaching a position regulating mechanism to an external rear-view mirror of a motor vehicle comprising:
- a housing that houses the position regulating mechanism;
- a support configured to be attached to the housing, the support comprising:
  - a base;
  - at least one elastic spring formed from or attached to the base wherein the elastic spring protrudes above the base before the housing has been attached to the support so as to apply a force against the housing when the housing is attached to the support; and
  - at least one fixing protrusion extending above the base;
- wherein the housing further comprises at least one surface portion configured to abut the at least one fixing protrusion; and
- wherein the housing is configured to attach to the support by pressing the housing against the at least one elastic spring until the at least one fixing protrusion engages the abutting surface portion, thereby securing the housing to the support;
- wherein the fixing device further comprises a plurality of elastic springs and a plurality of fixing protrusions on the base and corresponding abutting surface portions on the housing; and
- wherein each elastic spring is aligned to apply a force in a direction towards one of the surface portions and corresponding fixing protrusion.

10. The fixing device according to claim 9, wherein the elastic springs are arranged equiangularly around a center of the support and aligned along a radius of the support.

11. The fixing device according to claim 9, wherein the base has a shape that is substantially flat and circular.

12. A fixing device for attaching a position regulating mechanism to an external rear-view mirror of a motor vehicle comprising:
- a housing that houses the position regulating mechanism;
- a support configured to be attached to the housing, the support comprising:
  - a base;
  - at least one elastic spring formed from or attached to the base wherein the elastic spring protrudes above the base before the housing has been attached to the support so as to apply a force against the housing when the housing is attached to the support; and
  - at least one fixing protrusion extending above the base;
- wherein the housing further comprises at least one surface portion configured to abut the at least one fixing protrusion; and
- wherein the housing is configured to attach to the support by pressing the housing against the at least one elastic spring until the at least one fixing protrusion engages the abutting surface portion, thereby securing the housing to the support; and
- wherein each elastic spring is a cantilever spring.

13. The fixing device according to claim 12, wherein the base has a shape that is substantially flat and circular.

14. The fixing device according to claim 12, wherein the fixing device further comprises a plurality of elastic springs and a plurality of fixing protrusions on the base and corresponding abutting surface portions on the housing.

15. The fixing device according to claim 14, wherein each surface portion is a notch into which the corresponding fixing protrusion is inserted when the housing is attached to the support.

16. The fixing device according to claim 12, wherein each elastic spring is aligned to apply a force in a direction towards one of the surface portions and corresponding fixing protrusion.

17. The fixing device according to claim 12, wherein the elastic springs are arranged equiangularly around a center of the support and aligned along a radius of the support.

* * * * *